(12) United States Patent
Freimuth et al.

(10) Patent No.: US 8,478,878 B2
(45) Date of Patent: Jul. 2, 2013

(54) PLACEMENT OF VIRTUAL MACHINES BASED ON SERVER COST AND NETWORK COST

(75) Inventors: Douglas M. Freimuth, New York, NY (US); Xiaoqiao Meng, Yorktown Heights, NY (US); Vasileios Pappas, Elmsford, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 12/721,995

(22) Filed: Mar. 11, 2010

(65) Prior Publication Data

US 2011/0225277 A1   Sep. 15, 2011

(51) Int. Cl.
  *G06F 15/173* (2006.01)
  *G06F 9/455* (2006.01)
  *G06F 9/46* (2006.01)
  *G06F 21/00* (2006.01)

(52) U.S. Cl.
  USPC ............... 709/226; 709/223; 718/1; 718/104; 711/6

(58) Field of Classification Search
  USPC ............... 709/223, 226; 718/1, 104; 711/6
  See application file for complete search history.

(56) References Cited

U.S. PATENT DOCUMENTS

| | | |
|---|---|---|
| 2005/0251802 A1 | 11/2005 | Bozek et al. |
| 2005/0278722 A1 | 12/2005 | Armstrong |
| 2006/0085785 A1 | 4/2006 | Garrett |
| 2008/0107039 A1 | 5/2008 | Hadjieleftheriou et al. |
| 2008/0184229 A1 | 7/2008 | Rosu et al. |
| 2009/0106409 A1* | 4/2009 | Murata ..................... 709/223 |
| 2009/0125904 A1 | 5/2009 | Nelson |
| 2009/0276772 A1 | 11/2009 | Garrett et al. |
| 2010/0027420 A1* | 2/2010 | Smith ........................ 370/235 |
| 2010/0306445 A1* | 12/2010 | Dake ............................. 711/6 |
| 2011/0173329 A1* | 7/2011 | Zhang et al. ............... 709/226 |

OTHER PUBLICATIONS

Meng et al., "Improving the Scalability of Data Center Networks with Traffic-Aware Virtual Machine Placement", Published by IBM via techrepublic.com, p. 1-10.*
A. Burtsev, K. Srinivasan, P. Radhakrishnan, L.N. Bairavasundaram, K. Voruganti, and G.R. Goodson, "Fido: Fast Inter-Virtual-Machine Communication for Enterprise Appliances," Proc. Conf. USENIX Ann. Technical Conf. (USENIX '09), Jun. 2009.*

(Continued)

*Primary Examiner* — Lynn Feild
*Assistant Examiner* — Taylor Elfervig
(74) *Attorney, Agent, or Firm* — Thomas Grzesik; Fleit Gibbons Gutman Bongini & Bianco PL (57) ABSTRACT

A method, information processing system, and computer program product manage server placement of virtual machines in an operating environment. A mapping of each virtual machine in a plurality of virtual machines to at least one server in a set of servers is determined. The mapping substantially satisfies a set of primary constraints associated with the set of servers. A plurality of virtual machine clusters is created. Each virtual machine cluster includes a set of virtual machines from the plurality of virtual machines. A server placement of one virtual machine in a cluster is interchangeable with a server placement of another virtual machine in the same cluster while satisfying the set of primary constraints. A server placement of the set of virtual machines within each virtual machine on at least one mapped server is generated for each cluster. The server placement substantially satisfies a set of secondary constraints.

20 Claims, 6 Drawing Sheets

OTHER PUBLICATIONS

Wenyu Zhou; Shoubao Yang; Jun Fang; Xianlong Niu; Hu Song; , "VMCTune: A Load Balancing Scheme for Virtual Machine Cluster Using Dynamic Resource Allocation," Grid and Cooperative Computing (GCC), 2010 9th International Conference on , vol., no., pp. 81-86, Nov. 1-5, 2010.*

Apostolopoulos, G.; Hassapis, C.; , "V-eM: A Cluster of Virtual Machines for Robust, Detailed, and High-Performance Network Emulation," Modeling, Analysis, and Simulation of Computer and Telecommunication Systems, 2006. MASCOTS 2006. 14th IEEE International Symposium on , vol., no., pp. 117-126, Sep. 11-14, 2006.*

International Business Machines, A Method and System for the Cost-Optimal Placement of Virtual Machines under Security Constraints, IP.COM Prior Art Database, IPCOM000180995D, Mar. 23, 2009.

* cited by examiner

Algorithm 1 Cluster-and-Cut

Require: D(Traffic matrix), C(Cost matrix), k(Number of clusters, a parameter used in clustering and min-cut components)

1: n ← size of D {Find out VM count}

2: SlotClustering(C,k) {Partition slots into k clusters: $\{r_j\}$}

3. Sort $\{r_j\}$, in decreasing order of the cost of edges having one endpoint in $r_j$. Each edge only counts once 4: VMMinKcut (D, $\{r_1|.....r_k\}$) {Partition n VMs into k clusters $\{s_j\}$, $|s_j| = |r_j|$}

5. Assign $s_j$ to $r_j$, $\forall_j = 1, \ldots, n$ {One-to-one mapping between slot-cluster and VM-cluster}

6: for i = 1 to k do

7:    if $|s_j| > 1$ then {Multiple VMs in $s_j$}

8:       Cluster-and-cut(D($s_j$|, C($r_j$), $|s_j|$){D($s_j$): traffic matrix for $s_j$. C($r_j$): cost matrix for $r_j$. $|s_j|$: recursively call Cluster-and-Cut}

9:    end if

10: end for

FIG. 6

Algorithm 2 VMMinKcut

Require: G(Graph weight matrix), $\{b_1, \ldots, b_k\}$(size of each cluster)

1: n ← size of G

2: Compute Gomory-Hu tree for G and obtain n - 1 cuts $\{g_i\}$ {These n-1 cuts contains the minimum weight cuts for all server pairs}

3: Sort $\{g_i\}$ by increasing weight

4: for i = 1 to k do

5: Clear $s_i$

6: Find the minimum j such that removing $\{g_1, \ldots, g_j\}$ will partition G into two components: $c_1$ with size $|b_i|$ and $c_2$ with size n - $|b_i|$ 7: $s_i$ ← $c_1$ 8: G ← $c_2$ 9: n ← n - $|b_i|$ 10: end for

11: Return $\{s_i\}$

PLACEMENT OF VIRTUAL MACHINES BASED ON SERVER COST AND NETWORK COST

FIELD OF THE INVENTION

The present invention generally relates to the field of information processing systems, and more particularly relates to managing the placement of virtual machines on a network.

BACKGROUND OF THE INVENTION

In modern data centers, strategies for placing guest servers (e.g., virtual machines) on host servers (e.g., hypervisors) take into consideration performance metrics related to CPU utilization, memory usage, I/O usage, etc. However, such placement strategies can lead to sub-optimal network performance. For example, it is possible that two guest servers that exchange large quantities of traffic between each other will be placed on the network in such a way that their traffic has to traverse through multiple switches. This results in bandwidth waste at the aggregate or core switches and increased traffic latency.

SUMMARY OF THE INVENTION

In one embodiment, a method for managing server placement of virtual machines in an operating environment is disclosed. The method comprises determining a mapping of each virtual machine in a plurality of virtual machines to at least one server in a set of servers. The mapping substantially satisfies a set of primary constraints associated with the set of servers. A plurality of virtual machine clusters is created based on the mapping. Each virtual machine cluster in the plurality of virtual machine clusters comprises a set of virtual machines from the plurality of virtual machines. A server placement of one virtual machine in the set of virtual machines of a virtual machine cluster is interchangeable with a server placement of another virtual machine in the set of virtual machines of the virtual machine cluster while satisfying the set of primary constraints. A server placement of the set of virtual machines within each virtual machine on at least one server that has been mapped to the set of virtual machines is generated for each virtual machine cluster in the plurality of virtual machine clusters. The server placement substantially satisfies a set of secondary constraints.

In another embodiment, an information processing system for managing server placement of virtual machines in an operating environment is disclosed. The information processing system comprises a memory and a processor communicatively coupled to the memory. The information processing system further comprises a virtual placement unit. The virtual machine placement unit configured to determine a mapping of each virtual machine in a plurality of virtual machines to at least one server in a set of servers. The mapping substantially satisfies a set of primary constraints associated with the set of servers. A plurality of virtual machine clusters is created based on the mapping. Each virtual machine cluster in the plurality of virtual machine clusters comprises a set of virtual machines from the plurality of virtual machines. A server placement of one virtual machine in the set of virtual machines of a virtual machine cluster is interchangeable with a server placement of another virtual machine in the set of virtual machines of the virtual machine cluster while satisfying the set of primary constraints. A server placement of the set of virtual machines within each virtual machines on at least one server that has been mapped to the set of virtual machines is generated for each virtual machine cluster in the plurality of virtual machine clusters. The server placement substantially satisfies a set of secondary constraints.

In yet another embodiment, a computer program product for managing server placement of virtual machines in an operating environment is disclosed. The computer program product comprises a storage medium readable by a processing circuit and storing instructions for execution by the processing circuit for performing a method comprising determining a mapping of each virtual machine in a plurality of virtual machines to at least one server in a set of servers. The mapping substantially satisfies a set of primary constraints associated with the set of servers. A plurality of virtual machine clusters is created based on the mapping. Each virtual machine cluster in the plurality of virtual machine clusters comprises a set of virtual machines from the plurality of virtual machines. A server placement of one virtual machine in the set of virtual machines of a virtual machine cluster is interchangeable with a server placement of another virtual machine in the set of virtual machines of the virtual machine cluster while satisfying the set of primary constraints. A server placement of the set of virtual machines within each virtual machine on at least one server that has been mapped to the set of virtual machines is generated for each virtual machine cluster in the plurality of virtual machine clusters. The server placement substantially satisfies a set of secondary constraints.

In another embodiment, a method for improving network bandwidth utilization by utilizing traffic aware placement of virtual machines on available slots, where a slot is a virtual machine container is disclosed. The method comprises partitioning a plurality of slots into a plurality of slot clusters. A network distance between each slot in a slot cluster is smaller than a network distance between slots across different slot clusters. A plurality of virtual machines is partitioned into a plurality of virtual machine clusters. For each slot cluster there is a virtual machine cluster in the plurality of virtual machine clusters of substantially identical size. A traffic volume between virtual machines in a virtual machine cluster is larger than a traffic volume between virtual machines across different virtual machine clusters. Each slot cluster is paired with an equivalent size virtual machine cluster. A set of individual virtual machines is mapped to a set of individual slots for each pair of slot clusters and virtual machine clusters. The set of individual virtual machines is placed onto the individual slots that have been mapped thereto.

Various embodiments of the present invention provide a solution that enables placement of virtual machines (VMs) while minimizing, at the same time, both the server and the network cost. More specifically, the problem of joint optimization of the server and the network cost is challenging for the following two reasons: A) Each optimization problem has a different objective function. For example the server optimization problem seeks to minimize cost functions related to the server metrics. Such as the total number of servers used, or the total energy used, or the total number of recourses used, etc. In contrast, the network optimization problem tries to minimize cost functions related to network metrics, such as the total number of packets transmitted within the network, the average round-trip time for end-to-end paths, etc. B) The server optimization problem has a number of hard constraints that always need to be satisfied, while the network optimization problem optionally has a number of soft constraints that are fuzzy in terms of being satisfied. For example, in the server optimization problem, a hard constraint might be that a specific type of VM can only be hosted on a specific set of hypervisors. Another example of hard constraint is the following: a specific pair of VMs should never be hosted on the same hypervisor. An example of soft constraint in the case of network optimization problem is the following: a specific pair of VMs should be placed close to each other, in terms of network distance.

Note that the same challenges can arise in more general settings, when combining two optimization problems, with different objective functions and different types of constraints. As such various embodiments of the present invention provide a solution for combined such optimization problems in more general settings, where the optimization problems are not necessarily related with the VM placement that tries to minimize both the server and the network cost. For illustrative purposes though, various embodiments are presented within the context of the combined server and network optimization of the VM placement problem.

One or more embodiments prioritize the two optimization problems. The primary optimization problem, in one embodiment, is the server related problem for the reason that it is the problem with the set of hard constraints that need to be satisfied. The secondary optimization problem is the network related problem, given that it has a set of soft-constraints to be satisfied. This approach enables one or more embodiments to solve the primary problem, produce a set of solutions that are equivalent in terms of the primary problem, and then identify among those solutions the one that provides the best solution for the secondary optimization problem. Note that some embodiments not necessarily produce an enumeration of all the equivalent solutions of the primary problem. Instead, as it will become clear from the discussion below on, these embodiments can describe the set of equivalent solutions in a parametric fashion, without enumerating them. This enables various embodiments to solve the problem where the solution space of the primary problem is prohibitively large to be fully enumerated.

The method of solving the combined optimization problem can be divided into three discrete stages. In the first stage, the server related problem, i.e. the primary optimization problem, is solved. The input of the problem usually is a set of VMs to be deployed, a set of host machines on which these VMs can be deployed, and a set of server related constraints that needs to be satisfied. Examples of hard constraints are: a) a specific VM can only be deployed on a host machine with two or more free CPUs, b) a specific VM can be deployed on a VM hypervisor only, c) two specific VMs should never reside on the same host machine, etc. The output of this stage is a placement of VMs on the host machines that minimizes (or maximizes) a certain cost function, while satisfying all hard constraints. Examples of cost function include, the total number of host machines used, the total memory size used, the total energy consumption, etc. In this first stage, various optimization techniques can be used in order to solve the problem. Such techniques include: linear or integer programming, greedy algorithms, genetic algorithms, hill climbing algorithms, simulating annealing techniques, etc. In addition, it is not even necessary to actually solve the problem: one can take an existing deployment of VMs on host machines and consider that as the solution to the server related problem. Independently of the actual method used to solve the server related problem, the output of this stage is a set of VMs, a set of host machines and the mapping of VMs to host machines, which indicates which machine hosts or can host which VM.

Given the output of the first stage, the goal of the second stage is to produce all solutions, i.e. mappings between VMs and host machines that are equivalent to the output of the first stage. Being equivalent means that they come with the same cost and they satisfy all the constraints of the server related problem. In order to produce all equivalent solutions, without necessarily enumerating them, one or more embodiments first cluster the set of VMs that can inter-exchange positions, i.e. their mappings to the host machines, without violating the hard constraints. These clusters are produced as follows. For every pair of VMs, a total of N(N−1)/2 pairs of N VMs, one or more embodiments check if they can be inter-exchanged. Checking if two VMs can be interchanged can be done if all the hard constraints given as input in the first stage are known. Alternatively, in order to simplify the implementation of the second stage and sealed it from the various complexities of the first stage, one or more embodiments can have the first stage providing a function that enables the second stage to test if two VMs can be inter-exchanged. Given then all the pairs of VMs that can be inter-exchanged, one or more embodiments create a graph G, where the VMs are the vertices and the edges denote that the two connected VMs can be inter-exchanged. Given this graph G, one or more embodiments then enumerate all the maximal cliques of G. A clique C on a graph G is defined as a set of vertices in which every vertex in that set C has an edge with all other vertices in the same set C. A maximal clique of a graph G is clique of G that is not contained in any other clique of G. Note that there are some known heuristics that can produce the maximal cliques of a graph. Each of the maximal cliques represent of the set of VMs that can be inter-exchanged in any combination, without violating the constraints of the server related problem and while maintaining the same cost. The above clustering technique represents only one of the possible ways one can use in order to group equivalent VMs together, and other approaches can be used in this second stage in order to produce solutions equivalent to the solution of the first stage.

Note that in some cases, producing roughly equivalent solutions may be more desirable than having only strictly equivalent solutions. This can happen when the set of strictly equivalent solutions is very small and thus there is a small chance that any of these solutions might be able to minimize the network related problem, i.e. the secondary optimization problem. A roughly equivalent solution is one that does not achieve the same cost as the solution of stage one, but its cost is close enough, usually different within a certain percentage. In order to produce roughly equivalent solutions the second stage can be modified as follows: given the mapping of VMs and host machines produced in the first stage, the second stage, before proceeding with the construction of the graph G, can either add some additional host machines or can change some of the original ones with others. The choice of these new host machines depends on the network topology. For example, if the original set of host machines was connected to the same accesses switch with the exception of two host machines, then the second stage may replace those two host machines with another two that are connected to the same access switch as the rest of the host machines. Similarly, it is possible for the second stage to add some more host machines on top of the host machines produced in the first stage. These modifications of the original solution can possible have the following effects: a) first the cost function might become different, and b) some of the hard constraints might be violated. Depending on the cost function and the types of constraints that are violated this alternative solution, produced at the begging of the second stage, can be accepted or rejected. Optionally, a function provided from the first stage can be used in order to test if an alternative solution produced in the second stage is acceptable. After producing a valid alternative solution, the second stage proceeds with the creation of the graph G, and the enumeration of the maximal cliques of G.

Then, the third stage takes as input the maximal cliques of the second stage in combination with the host machines that are mapped to, and for each set of maximal clique and associated host machines it solves the network related problem, i.e. the secondary optimization problem. Note that the network problem is solved for each maximal clique independently of the other cliques. In other words only the host machines associated with the VMs of a maximal clique can be used for the placement of those VMs. Note though that VMs from different maximal cliques can be mapped to the same host machines. Various algorithms can be used in order to solve the network related problem, however one or more embodiments provide a novel algorithm. All these algorithms take as input a set of equivalent VMs, i.e. a maximal clique, and a set of slots belonging to the host machines where those VMs can be placed on. A slot represents a resource container within a host machine. This resource container can host only one VM. For example, if two VMs are mapped to the same host machines then that machine creates two resource containers, i.e. slots, one for each VM. The output of the network related placement algorithm is a mapping of VMs to slots that minimizes a network cost. Then given all the outputs of the network related placement algorithm for the different maximal cliques, the third stage combines all of them and produces a final mapping between VMs and host machines, which optimization both the primary and the secondary objectives, i.e. server cost and network cost respectively, while satisfying the hard and soft constraints.

Optionally, the output of the third stage can be used in order to identify whether the secondary optimization goal is close enough to the best possible, and then adjust the alternative solution of the second stage in order for the secondary goal to be closer to the best possible, potentially in the expense of the primary goal. More specifically, after the third stage produces the output as described above, one can compare the cost value of the network related problem, i.e. secondary optimization problem, against the most optimal value that can be achieved. The most optimal value can be produced by running the network related placement algorithm on the same problem without taking into consideration the server constraints and the server cost. That is, the thirds stage is given as input the set of VMs and the set of host machines that was originally given as input in the first stage. With this input the third stage produces the best possible placement in terms of network cost. Then if the network cost value of the server constrained solution, i.e. the solution of the combined optimization problem, differs more than certain percentage points than the optimal cost of the network problem, then one or more embodiments can go back to the beginning of the second stage and produce a roughly equivalent solution by expanding or changing the set of host machines (as explained before). This process can be repeated multiple times until a good compromise between the server and network cost is achieved.

A more detailed discussion on solving the network related placement problem is given below. It should be noted that the input of the problem is a set of equivalent VMs and a set of slots that reside on a set of host machines.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
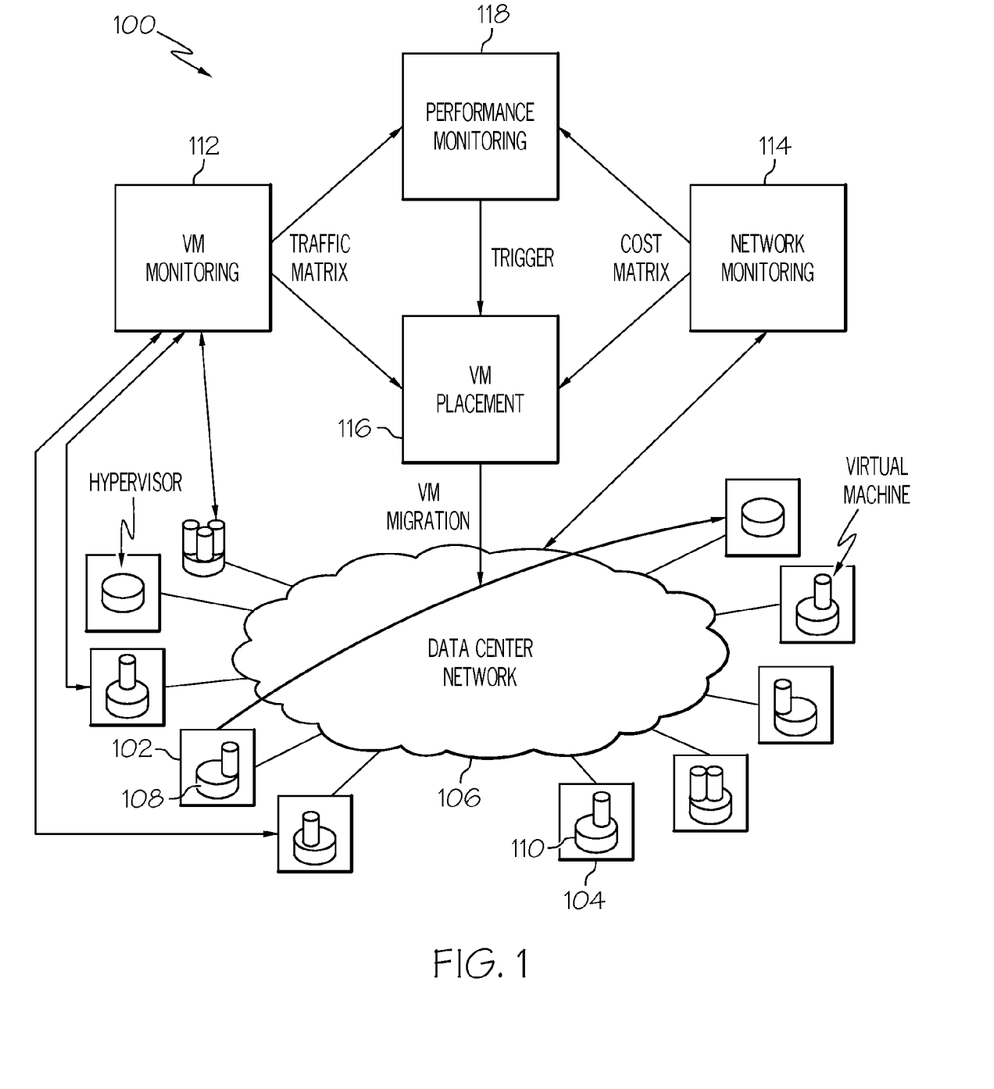
FIG. 1 is a block diagram illustrating an exemplary computing environment according to an embodiment of the present invention.

FIG. 1 shows an exemplary operating environment applicable to various embodiments of the present invention. In particular, FIG. 1 shows an operating environment 100 comprising a plurality of processing nodes such as a first information processing system 102 and a second information processing system 104. It should be noted that for simplicity only the first and second information processing systems 102, 104 have been explicitly identified in FIG. 1 to represent the plurality of processing nodes illustrated. Each of the plurality processing nodes 102, 104 are communicatively coupled to a network 106 such as, but not limited to, a data center network. The data center network 106 can comprise, but is not limited to, a three-tier architecture. Examples of data center network architectures are Ethernet, VLAN, VL2 See A. Greenberg, J. R. Hamilton, N. Jain, S. Kandula, C. Kim, P. Lahiri, D. A.

Maltz, P. Patel, and S. Sengupta, "VL2: A scalable and flexible data center network," in SIGCOMM '09: *Proceedings of the ACM SIGCOMM 2009 conference on Data communication,* 2009), PortLand (See N. F. N. H. P. M. S. R. V. S. Radhika Niranjan Mysore. Andreas Pamboris and A. Vandat. "PortLand: A scalable fault-tolerant layer 2 data center network fabric," in *SIGCOMM 2009 conference on Data communication.* 2009), and BCube (See "Bcube: A high performance, server centric network architecture for modular data center," in SIGCOMM '09: *Proceedings of the ACM SIGCOMM 2009 conference on Data communication.* ACM, 2009), which are all hereby incorporated by reference in their entireties.

In one embodiment, each of the processing nodes 102, 104 in the plurality of processing nodes comprises one or more virtual machines (VMs) 108, 110. The operating environment 100 also comprises a VM monitoring module 112, a network discovery and monitoring module 114, a VM placement module 116, and a performance adjustment module 118. Each of these modules 112, 114, 116, 118 is communicatively coupled to each other. One or more of these modules 112, 114, 116, 118 can reside on a remote information processing system(s) and/or on one or more of the plurality of processing nodes 102, 104. Each of these modules 112, 114, 116, 118 is discussed in greater detail. Also, each of these modules collectively creates a VM placement unit.

Processing Node

Figure 2:
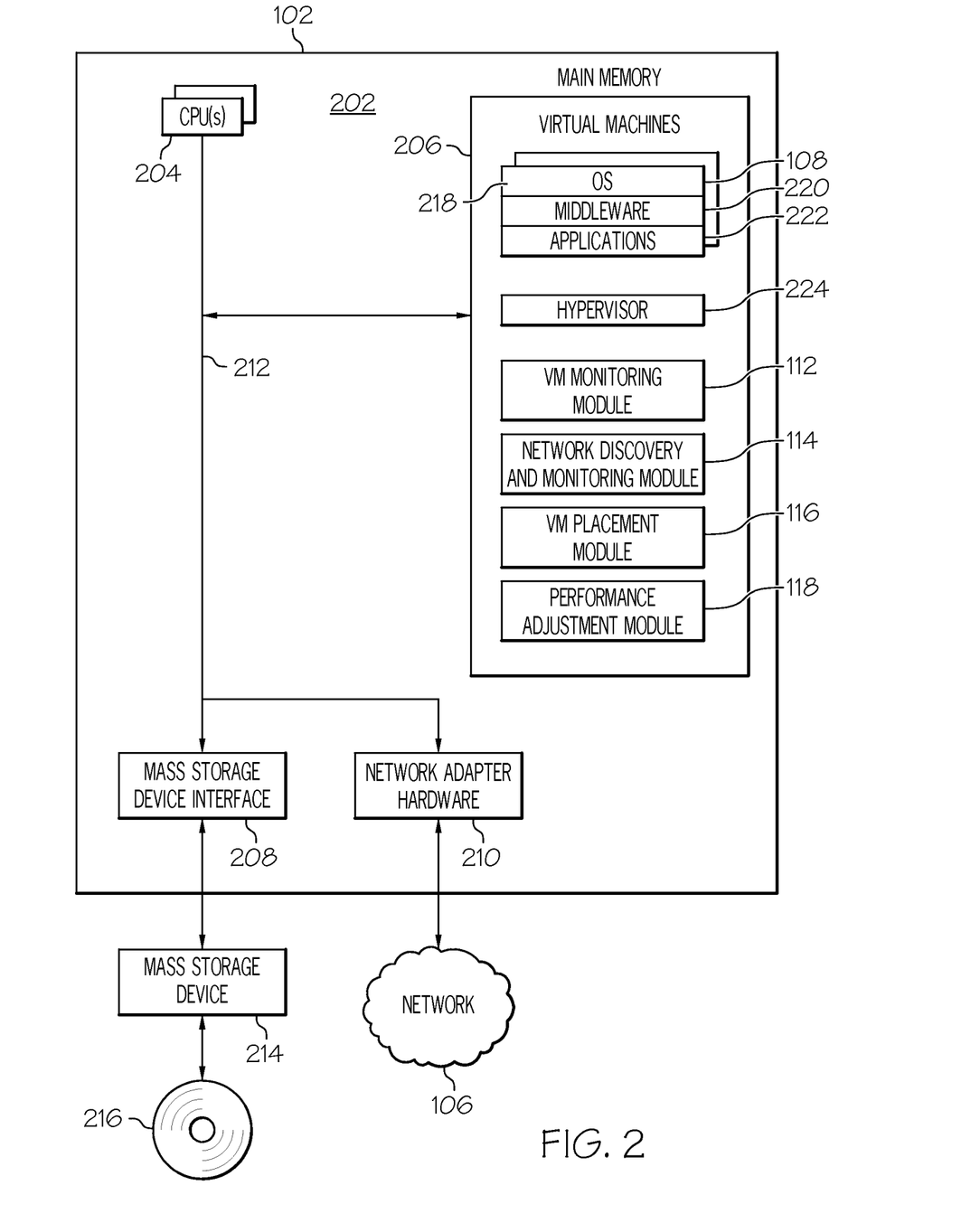
FIG. 2 is a detailed view of an information processing system according to an embodiment of the present invention.

FIG. 2 is a block diagram illustrating a detailed view of a processing node. In this embodiment, the processing node illustrated in FIG. 2 is the information processing system 102 of FIG. 1. However, the processing node of FIG. 2 can be any of the processing nodes in FIG. 1. Any suitably configured processing system is similarly able to be used as the information processing system 102 in further embodiments of the present invention (for example, a personal computer, workstation, or the like). The information processing system 102 includes a computer 202. The computer 202 has a processor(s) 204 that is connected to a main memory 206, mass storage interface 208, and network adapter hardware 210. A system bus 212 interconnects these system components. The mass storage interface 208 is used to connect mass storage devices, such as data storage device 214, to the information processing system 102. One specific type of data storage device is an optical drive such as a CD/DVD drive, which may be used to store data to and read data from a computer readable medium or storage product such as (but not limited to) a CD/DVD 216. Another type of data storage device is a data storage device configured to support, for example, NTFS type file system operations.

Although only one CPU 204 is illustrated for computer 202, computer systems with multiple CPUs can be used equally effectively. Various embodiments of the present invention are able to use any other suitable operating systems as well. The network adapter hardware 210 is used to provide an interface to one or more networks 106. Various embodiments of the present invention are able to be adapted to work with any data communications connections including present day analog and/or digital techniques or via a future networking mechanism. Although one or more embodiments of the present invention are discussed in the context of a fully functional computer system, those skilled in the art will appreciate that embodiments are capable of being distributed as a program product via CD or DVD, e.g., CD 216, CD ROM, or other form of recordable media, or via any type of electronic transmission mechanism.

The main memory 206, in one embodiment, comprises one or more virtual machines 108, 110. A virtual machine, in this embodiment, is a discrete execution environment within a single computer to make the computer function as if it were two or more independent computers. Each virtual machine 108, 110 is assigned all the resources it needs to operate as though it were an independent computer, including processor time, memory, an operating system, and the like. Each virtual machine 108, 110 comprises an operating system 218, middleware 220, applications 222, and the like. Each virtual machine 108 can support specific guest operating systems and multiple user sessions for executing software written to target the guest operating systems. For example, one virtual machine may support an instance of the Linux® operating system, while a second virtual machine executes an instance of the z/OS® operating system. Other guest operating systems can also be supported as well.

The operating system 218 is a layer of system software that schedules threads and provides functions for making system resources available to threads, including memory access, access to input/output resources, and the like. The operating system also controls allocation and authorization for access to computer resources. The operating system performs low-level basic tasks such as recognizing input from a keyboard, sending output to a display screen, keeping track of files and directories on a magnetic disk drive, and controlling peripheral devices such as disk drives and printers.

The operating system is also responsible for security, ensuring that unauthorized users do not access the system and that threads access only resources they are authorized to access. Operating systems useful for scheduling threads in a multi-threaded computer according to embodiments of the present invention are multi-threading operating systems, examples of which include UNIX™, Linux, Microsoft NT™, AIX™, IBM's i5os, and many others. The middleware 220 is software that connects multiple software applications for exchanging data. Middleware can include application servers, content management systems, web servers, and the like. Applications 222 are any software programs running on top of the middleware 220.

The main memory 206 also includes a hypervisor 224. The hypervisor 224 is a layer of system software that runs under the operating system and the virtual machines 108. That is, a hypervisor 224 runs between an operating system 218 and underlying physical computer components including physical processors 204. It is the function of the hypervisor 224, among other things, to manage virtual machines 108. Although only one hypervisor 224 is shown, each virtual machine 108 can include its own hypervisor.

The main memory 206, in one embodiment, also comprises the VM monitoring module 112, the network discovery and monitoring module 114, the VM placement module 116, and the performance adjustment module 118. Although illustrated as concurrently resident in the main memory 106, it is clear that respective components of the main memory 106 are not required to be completely resident in the main memory 106 at all times or even at the same time. It should be noted that although these modules 112, 114, 116, 118 are shown residing outside of the hypervisor 224 one or more of these modules can reside within the hypervisor 224 as well. It also should be noted, as discussed above, these modules 112, 114, 116, 118 are not required to reside within a single processing node. For example, one or more of these modules 112, 114, 116, 118 can reside on a remote information processing system(s) and/or on one or more of the plurality of processing nodes 102, 104.

The VM monitoring module 112, constructs a traffic matrix between pairs of VMs. The traffic matrix reports the pair-wise traffic between VMs (as well VMs and their default getaway)

for a given period of time. For example, the traffic matrix can report the number of packets (or number of bytes) exchanged between VMs in five minutes periods. In addition, the system may optionally store a series of traffic matrixes (in a loss-less or an aggregate format). These series of traffic matrices can be used, for example, in order to predict future traffic demands between VMs or to identify changes in the traffic patterns based on the historical data.

The traffic matrix can be constructed, in one embodiment, by appropriately instrumenting network traffic monitoring. An accurate construction of the traffic matrix is achieved when the hypervisor 234 provides support for flow monitoring (e.g., Netflow support of the open vswitch in Linux). In this case, the exported flow information is collected into a central location where the full traffic matrix can be trivially constructed. Optionally, flow information can be processed in a hierarchical manner in the case of large case deployments. If flow exporting is not supported on the hypervisor 234 then physical switches of the data center network 106 can be used for that purpose. A third approach is to infer the traffic matrix from aggregate statistics collected on switch ports (e.g., total incoming and outgoing packet counts, bytes, etc.) in combination with layer 2 forwarding information (e.g., MAC forwarding tables, VLAN configurations) and application layer information (e.g., application dependencies). The third approach can be implemented on currently available equipment (no special support is needed). Finally, in a different embodiment that does not require traffic monitoring, the traffic matrix can be inferred by the application level topology. Given that typically sets of virtual machines interconnect in order to form composite applications, the application level topology of those composites applications in combination with traffic models of the application level connections can be used to predict the traffic matrix. Note that this last embodiment enables the traffic matrix construction even before the deployment of virtual machines.

The VM monitoring module 112 also monitors the server requirement for each VM. A server, in one embodiment, is an information processing system that hosts a hypervisor operating system and either zero or one or more virtual machines. The network discovery and monitoring module 114 constructs a network cost matrix of the data center network 106. The cost matrix reflects the communication cost between pairs of available slots on the hypervisors (a slot on a hypervisor refers to a resource container that can host a VM). The communication cost can take various forms. In the simplest case the communication cost for two endpoints is defined as the number of network hops between them. Another type of network cost can capture the actual utilization of the links between the two endpoints, in which case it can be defined as the maximum of the average utilization (over some period of time) on those links. Constructing the network cost requires full knowledge of the network topology (as well as the hypervisors attachment points into the network) as well as knowledge about the forwarding paths (layer 2 and layer 3 pacts) between any pair of hypervisors. In addition, constructing the network cost also may require knowledge about link utilization (or other types of communication costs). This information can be obtained, in one embodiment, from network management tools.

The VM placement module 116 takes as input the server utilization (CPU, memory, I/O, etc.), the VM server requirements, the traffic, and the cost matrices, and produces as output a placement of VMs within the network that satisfies the VM server requirements and at the same time minimizes the product of pair-wise traffic between VMs and their network cost. The VM placement module 116 assigns VMs to slots while minimizing the overall objective function. In order to minimize the objective function, an inequality requires that VM pairs with heavy traffic volume shall be assigned to slot pairs with low distance. Instead of a direct mapping from individual VMs to individual slots, a two-step mapping method, in one embodiment, is used. In the first step, VMs are grouped into clusters by placing VM pairs with heavy traffic in the same cluster. In accordance with the VM clusters, slots are grouped into clusters by placing slot pairs in different clusters if such a slot pair has large distance. The goal for these two clustering processes are two-fold: (1) for any VM cluster there is a corresponding slot cluster with equal cluster size; (2) the one-to-one correspondence ensures that VM-clusters with large intra-cluster traffic volume are assigned to those slot-clusters with small intra-cluster distance. In the second step, inside each VM cluster and its associated slot cluster, individual VMs are assigned to individual slots.

The performance adjusting module 118 monitors changes in the VM workload (addition and deletion of VMs, changes in the VM requirements, major shifts in the traffic matrix) as well as changes in the cost matrix and requests reshuffling of VMs when the placement is sub-optimal.

The processes/functions discussed above with respect to the modules 112, 114, 116, 118 are discussed in greater detail below.

Virtual Machine Placement

Modern data centers provide a virtual computing environment for customers to run applications or services, with computing resources being allocated with the use of virtual machines (VMs) [(Amazon Elastic Compute Cloud, http://aws.amazon.com/ec2/)], which is hereby incorporated by reference in its entirety. With an increasing amount of workload and customers shifting to virtualized data center environments, scaling issues impose grand challenges for the underlying network architecture. This issue has attracted significant attention in the past two years. See, for example, M. Al-Fares, A. Loukissas, and A. Vandat, "A scalable, commodity data center network architecture," in *SIGCOMM '08: Proceedings of the ACM SIGCOMM 2008 conference on Data communication*. ACM, 2008, pp. 63-67, N. F. N. H. P. M. S. R. V. S. Radhika Niranjan Mysore. Andreas Pamboris and A. Vandat. "PortLand: A scalable fault-tolerant layer 2 data center network fabric," in *SIGCOMM 2009 conference on Data communication*. 2009, A. Greenberg, J. R. Hamilton, N. Jain, S. Kandula, C. Kim, P. Lahiri, D. A. Maltz, P. Patel, and S. Sengupta, "VL2: A scalable and flexible data center network," in *SIGCOMM '09: Proceedings of the ACM SIGCOMM 2009 conference on Data communication*, 2009, C. Guo, H. Wu, K. Tan, L. Shi, Y. Zhang, and S. Lu, "Dcell: a scalable and fault-tolerant network structure for data centers," in *SIGCOMM '08: Proceedings of the ACM SIGCOMM 2008 conference on Data communication*. ACM, 2008, pp. 75-86, "Bcube: A high performance, server centric network architecture for modular data center," in *SIGCOMM '09: Proceedings of the ACM SIGCOMM 2009 conference on Data communication*. ACM, 2009, A. Greenberg, J. Hamilton, D. A. Maltz, and P. Patel, "The cost of a cloud: research problems in data center networks," *SIGCOMM Comput. Commun. Rev.*, vol. 39, no. 1, pp. 68-73, 2009, which are hereby incorporated by reference in their entireties.

Although these proposals differ in many manners, they share two common ideas: i) data center network should have rich physical connectivity at the edge to satisfy growing throughput demand between end hosts, and ii) more intelligent layer 2 or layer 3 routing protocols should be employed to better balance traffic load.

Various embodiments of the present invention address the scalability issue from a different perspective; they improve network capacity via optimizing the placement of VMs. Generally, the traffic distribution at individual VMs in a production data center environment is uneven, relatively stable over large timescale, and there is a low correlation between traffic volume and end-to-end latency. These observations show that if VM placement is planned appropriately, it is possible to localize a large portion of the traffic and shorten the distance between VMs with heavy traffic exchanged. The benefits are twofold: the aggregate traffic at top-level switches is reduced; the overall traffic latency is improved.

Also, while a data-center environment may host hundreds of thousands of guest servers, traffic between guest servers are inherently clustered, with a number of guest servers having heavy traffic between them fall into one cluster, and guest servers across clusters having light traffic. Thus, if one is able to identify these clusters of servers, their placement can be based on their cluster size and the network communication cost between host servers that can accommodate the clusters. Therefore, various embodiments of the present invention identify the guest server clusters and their mapping to the host server clusters based on two input information sets: the traffic matrix between the guest and the network cost matrix between host servers.

The various embodiments are advantageous over the prior art because they enable the placement of virtual machines in a way that optimizes the network traffic in a data-center in addition to satisfying the server requirements (CPU, memory, I/O) of the VMs. The benefits are at least two-fold: (1) the scalability of the data-center network is improved in terms of the number of guest servers and the amount of traffic that it can support; (2) end-to-end packet latency is reduced and, thus, application performance is improved.

As will be discussed in greater detail below, various embodiments of the present invention formally define the Virtual Machine Placement Problem (VMPP) as an optimization problem. The optimal solution to VMPP dictates where VMs should be placed in order to simultaneously minimize the aggregate traffic volume in the network and the average end-to-end latency. This VM placement problem radically differs from previous VM placement approaches where normally only the server CPU, memory, and power consumption is considered in the VM migration (See, for example, R. Nathuji and K. Schwan, "Virtualpower: coordinated power management in virtualized enterprise systems," in *SOSP '07: Proceedings of twenty-first ACM SIGOPS symposium on Operating systems principals*, 2007, pp. 265-278, C. Clark, K. Fraser, S. Hand, J. G. Hansen, E. Jul, C. Limpach, I. Pratt, and A. Warfield, "Live migration of virtual machines," in *NSDI '05: Proceedings of the 2$^{nd}$ conference on Symposium on Networked Systems Design & Implementation*. Berkeley, Calif., USA: USENIX Association, 2005, pp. 273-286, which are hereby incorporated by reference in their entireties).

VMPP is a NP-hard problem and, therefore, various embodiments propose a heuristic algorithm that combines clustering and mm-cut techniques to obtain an approximate solution. The algorithm of various embodiments of the present invention differs from existing methods by leveraging unique features of the traffic patterns and the underlying data center network architecture. Experiments were performed by using traces collected from production data centers. The experimental results show that the algorithm of various embodiments significantly improves performance and reduces the computation time when compared against at least two existing representative methods.

One or more embodiments of the present invention utilize a three stage process. In the first stage a primary objective is optimized while satisfying hard constraints (higher priority). In this stage, any server-based placement algorithm can be used. In the second stage equivalent (optimal) solutions are identified from the first stage. In the second stage various clustering techniques are used to identify the equivalent solutions. The third stage optimizes a secondary objective among the equivalent solutions from the second stage while satisfying soft constraints (lower priority). Any network-based placement method can be used, however, the following discussion is directed to a novel VM placement method. In addition to the present discussion, this novel VM placement method is discussed in the commonly owned paper entitled "Improving the Scalability of Data Center Networks with Traffic-aware Virtual Machine Placement", Meng et al., IEEE Infocom, March 2010, San Diego, U.S. which is hereby incorporated by reference in its entirety. Each of the above stages is discussed in greater detail below. It should be noted that the placement methods of various embodiments can be triggered by, for example, new VMs being added to the data center 106; existing VMs being terminated or paused; the traffic matrix being changed by a given amount; the cost matrix being changed by a given amount; the total placement cost (i.e., the sum of the products for pair-wise traffic and network cost) being changed by a given amount since the last run of the VM placement method; and/or the like.

During the first stage, each VM is mapped to a host while satisfying all hard constraints such as, but not limited to, CPU, memory, and the like, by using a server-based placement algorithm. For instance, the following greedy algorithm can be used. Assuming that the hard constraint refers to the number of available CPUs on the server, then each VM is pinned to a specific number of CPUs. The server that is placed on should always have those CPUs available for the VM. The goal is to place a set of VM on a set of servers, while minimizing the servers used. The greedy algorithm creates a sorted list of VMs based on the number of CPUs that they require, starting from the highest to the lowest number of CPUs. Similarly, the algorithm creates a sorted list for unused servers based on the number of their available CPUs, starting from the highest to the lowest number of available CPUs. The list of unused server is originally populated with all available servers, but it decreases by one whenever a server gets to host a VM. When that happens, the server is moved to another list of used servers, again sorted from the server with highest number of available CPUs to the lowest number of available CPUs.

A VM gets assigned to a server as follows: For each VM that is at the head of the VM sorted list, the algorithm looks if the server at the head of the list of used servers has the available number of CPUs required by the VM. If yes, then the VM is assigned to that server and the list of used servers is sorted again in order to reflect the change of available CPUs on that server. If no, then the algorithm looks if the first server in the list of unused servers has the available number of CPUs required by the VM. If yes, then the algorithm removes that server from the list of used servers and places it in the list of used servers, while sorting again the later list. If no, then the greedy algorithm cannot find a solution to the placement problem. In either case where the VM is assigned to a server, used or unused, the VM is removed from the sorted list of VMs, and the whole process repeats with the next VM. The algorithms finishes successfully when all VMs have been placed, or it fails when a VM cannot be placed on any server.

Figure 3:
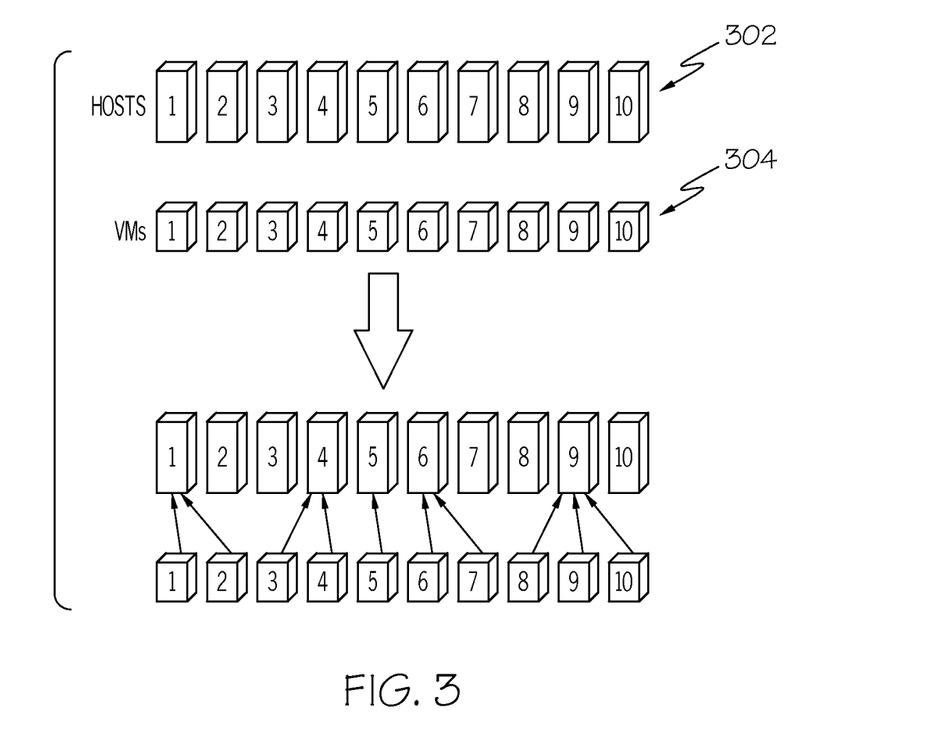
FIG. 3 shows an example of mapping virtual machines to hosts according to one embodiment of the present invention.

FIG. 3 shows a plurality of hosts/servers 302 and a plurality of VMs 304. FIG. 3 also shows how VMs have been mapped to a host/server as a result of the first stage. For example, FIG. 3 shows that VM1 and VM2 have been mapped to Host1; VM3 and VM4 have been mapped to Host4; VMS has been mapped to Host5; VM6 and VM7 have been mapped to Host6; and VM8, VM9, and VM10 have been mapped to Host9.

Figure 4:
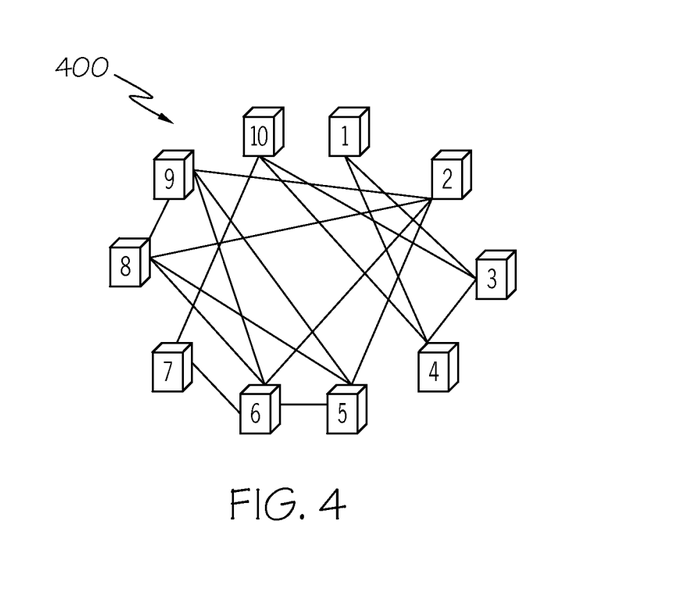
FIG. 4 illustrates one example of a virtual machine equivalence graph according to one embodiment of the present invention.

During the second stage, all of the VMs with equivalent constraints, i.e., VMs that can be swapped without violating any hard constraint, are clustered together. In particular, each VM is compared with each other to identify equivalent VMs so that the placement of these VMs can be swapped while still satisfying the requirements (i.e., constraints) of the first stage. Stated differently, for every pair of VMs a link is created if the two VMs can be swapped without violating any hard constraints. A VM equivalence graph 400, as shown in FIG. 4, is generated from the set of equivalent VMs that have been identified. All maximal cliques in the VM equivalence graph 400 (classical clique-listing problem) are then enumerated. The cliques are then sorted. For example, in one embodiment, the cliques are sorted in a descending order based on their size. The result of this second stage is a set of solutions equivalent the solution of the first stage.

In some cases, producing roughly equivalent solutions may be more desirable than having only strictly equivalent solutions. This can happen when the set of strictly equivalent solutions is very small and thus there is a small chance that any of these solutions might be able to minimize the network cost. A roughly equivalent solution is one that does not achieve a server cost same as the solution of the first stage, but its cost is close enough, usually different within a certain percentage. In order to produce roughly equivalent solutions the second stage can be modified as follows: given the mapping of VMs and servers produced in the first stage, the second stage, before proceeding with the construction of the equivalence graph, can either add some additional servers or can change some of the original ones with others. The choice of these new servers depends on the network topology. For example, if the original set of servers was connected to the same accesses switch with the exception of two servers, then the second stage may replace those two servers with another two that are connected to the same access switch as the rest of the servers. Similarly, it is possible for the second stage to add some more servers on top of the ones produced in the first stage. These modifications of the original solution can possible have the following effects: a) first the cost function might become different, and b) some of the hard constraints might be violated. Depending on the cost function and the types of constraints that are violated this alternative solution, produced at the begging of the second stage, can be accepted or rejected. After producing a valid alternative solution, the second stage proceeds with the creation of the equivalence graph, and the enumeration of its maximal cliques.

Figure 5:
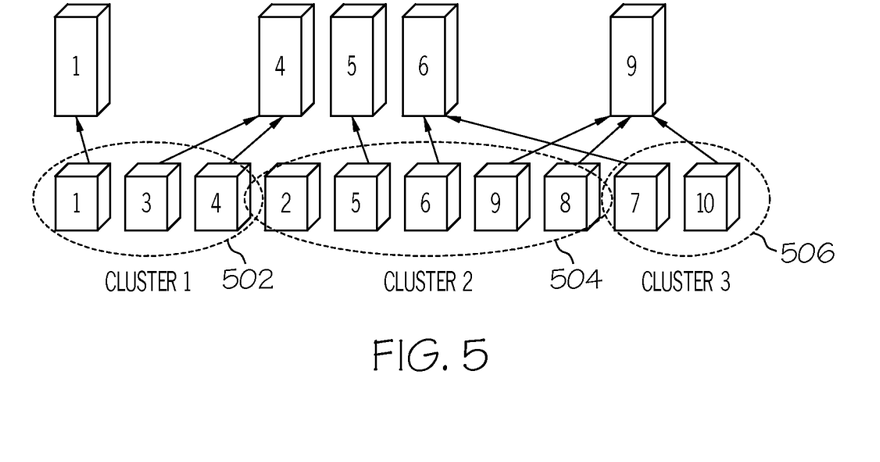
FIG. 5 shows one example of clustering virtual machines according to one embodiment of the present invention.

FIG. 5 shows an example of the clustering of VMs as a result of the second stage. In particular, FIG. 5 shows that VM 1, VM3, and VM4 have been clustered into a first cluster group 502; VM2, VMS, VM6, VM9, and VM8 have been clustered into a second cluster group 504; and VM7 and VM10 have been clustered into a third cluster group 506. In the example of FIG. 5, each of the cluster groups represents VMs that are equivalent, i.e., the placement of each VM can be swapped without violating any hard constraints of the first stage.

Once the equivalent VMs are clustered in second stage, the third stage, for each VM cluster, reshuffles the mapping of VMs to hosts while reducing the network cost by using a network-based placement method. This network-based placement first partitions VMs and slots separately into clusters. A slot represents the placeholder of a VM instance. Stated differently, a slot typically refers to a physical server (or a logical partition on a physical server) bound to a port on a switch. A first tier of the network-based placement method matches VM clusters with slot clusters. For example, this first tier matches VM clusters with large internal traffic with slot clusters with small internal distance. The second tier solves the VM assignment within each cluster.

The following is a more detailed discussed of the third stage discussed above where VMs are placed using a network-based placement method. Assuming there are n VMs in a data center they need to be assigned to n slots on a one-to-one mapping. Assuming a static topology, the communication cost from slot i to j is fixed and denoted by $C_{ij}$. $D_{ij}$ denotes traffic volume or rate from VM i to j. For any placement that assigns the n VMs to the n slots, there is a corresponding permutation function $\pi: [1, \ldots ,n] \to [1, \ldots n]$. A Virtual Machine Placement Problem (VMPP) is defined as finding a it such that the following, objective function is minimized:

$$\sum_{i,j=1,\ldots,n} D_{i,j} C_{\pi(i)\pi(j)} \quad \text{(EQ. 1)}$$

The above objective function is equivalent to:

$$\min_{X \in \Pi} tr(DX^T C^T X) \quad \text{(EQ. 2)}$$

Where tr( ) for an input matrix A is defined as $tr(A)=\Sigma_i A_{ii}$. X is a permutation matrix. $\Pi$ is the set of permutation matrices. Note that a permutation matrix X is to satisfy three constraints:

$X_{ij} \in \{O,1\}(\forall i,j), \Sigma_{j=1}^n X_{ij}=1(\forall i), \Sigma_{i=1}^n X_{ij}=1(\forall j).$ The communication cost $C_{ij}$ as the number of switches on the routing path from VM i to j. $C_{ij}$ is a constant value since static routing is assumed; traffic from one VM to another always takes the same single path or multiple paths but with equal cost. Given such a definition, the objective function value is the sum of the aggregate traffic received by every switch. When it is normalized by the total traffic volume, the value is equivalent to the average number of switches that a traffic unit needs to go through. If it is assumed that every switch causes equal delay, this objective function can be interpreted as the average latency perceived by a traffic unit.

The VMPP problem is applicable in many data center management scenarios, which can be either offline or online In a typical offline usage scenario, multiple customers place requests for VM creation. The data center operators first estimate the traffic matrix based on customers' input, then collect the network topology information, and solve the VMPP problem to decide where VMs should be created. In a typical online scenario, VMs have been created and running, the operators periodically collect traffic matrix and re-solve the VMPP problem. Once a better objective function value is computed, the operators need to assess whether a shuffling of VMs assignment is worthy by taking VM migration cost into consideration. In one embodiment, an equal number of VMs and slots are assumed. When there are more available slots than VMs, the two numbers can be made equal by introducing dummy VMs without any incoming or outgoing traffic.

The computational complexity of VMPP is now analyzed. When C and D are matrices with arbitrary real-values, VMPP falls into the category of *Quadratic Assignment Problem*

(QAP) in the Koopmans-Beckmann form (See P. O. B. N. P. H. Eliane Maria Loilola, Nair Maria Maia de Abreu and T. Querido, "A survey for the quadratic assignment problem," *European Journal of Operational Research*, vol. 176, pp. 657-690, 2007, which is hereby incorporated by reference in its entirety). QAP is a known NP-hard problem (See S. Sahni and T. Gonzalez, "P-complete approximation problems," *Journal of the Association of Computing Machinery*, vol. 23, pp. 555-565, 1976, which is hereby incorporated by reference in its entirety). In fact, it is one of the most difficult problems in NP-hard class as shown in Sahni et al., even finding an σ-approximation algorithm (a is a constant) is NP-hard. Although various methods for solving QAP have been studied (See Loilola et al.), there is a general agreement that finding the optimality of QAP problems with size>15 is practically impossible.

In the context of data center networks, the VMPP problem becomes a special case of QAP since the network topology and the cost definition of various embodiments impose constraints on D. Assuming, in this example, that the data center network topology follows one of the four architectures mentioned above (i.e., VLAN, VL2, PortLand, and BCube) then:

Theorem I: Finding the optimality of VMPP in data centers is NP-hard.

Proof: This can be proved by a reduction from the Balanced Minimum K-cut Problem (BMKP) (See M. R. Garey and D. S. Johnson, *Computers and Intractability: A Guide to the Theory of NP-Completeness*. W.H.Freeman, 1979 and H. Saran and V. V. Vazirani, "Finding k cuts within twice the optimal," *SIAM J. Comput.*, vol. 24, no. 1, pp. 101-108, 1995, which are hereby incorporated by reference in their entireties). The BMKP problem is as follows: G=(V, E) is an undirected, weighted graph with n vertices and n is a positive integer divisible by another positive integer k. A k-cut on G is defined as a subset of E that partition G into k components. The k-cut weight is defined as the sum of the weights on all the edges in the k-cut. The BMKP problem is to find a k-cut with minimum weight whose removal partitions G into k disjoint subsets of equal size $$\frac{n}{k}.$$

WMBP is an extended problem from the Minimum Bisection Problem (MBP). Both BMKP and MBP are known to be NP-hard (See Gary et al. and Saran et al.).

Now considering a data center network, regardless of which architecture is being used, a network topology can always be created to satisfy the following requirements: there are n slots that are partitioned into k slot-clusters of equal size $$\frac{n}{k}\left(\frac{n}{k};\right.$$

is a positive integer). Every two slots have a connection labeled by a cost value. The cost for connections within same cluster is equal, denoted by $c_i$. The cost for connections across clusters is equal and denoted by $c_j$ (with $c_i > c_j$).

Assuming there are n VMs with traffic matrix D. By assigning these n VMs to the n slots, a VMPP problem is obtained. Meanwhile, if a graph comprising of the n VMs as nodes and D as edge weights is defined, a BMKP problem is associated with the VMPP problem can be obtained. Any solution to the VMPP also gives a solution to the associated BMKP. This is because the solution to the VMPP partitions the n VMs into k groups, each group corresponding to a slot-cluster. The edges between all VM pairs that are assigned to two different slot-clusters can be considered as a k-cut, and the traffic between all such VM pairs are the k-cut weight. It can be shown that when the VMPP is optimal, the associated BMKP is also optimal. Equivalently, when the VMPP is optimal, if any two VMS i, j that have been assigned to two slot-cluster $r_1, r_2$, respectively, are swapped, the k-cut weight will increase. To prove this, how much the k-cut weight changes due to the swap of i, j is computed. Clearly, this computation only needs to involve those VM pairs of which one is i or j and the other is assigned to $r_1$ or $r_2$. Let $s_l$ denote the set of VMS assigned to $r_1$ ($s_1$ excludes the VM i or j). Analogously, $s_1$ can be defined. Because the VMPP objective value increases:

$$\sum_{\forall k \in s_1}[D_{jk}(c_i - c_o) + D_{i,k}(c_o - c_i)] + \qquad (EQ. 3)$$

$$\sum_{\forall k \in s_2}[D_{jk}(c_o - c_i) + D_{ik}(c_i - c_o)] > 0$$

The amount of change for the k-cut weight is:

$$\left[\sum_{\forall k \in s_1}(D_{ik} - D_{jk}) + \sum_{\forall k \in s2}(D_{jk} - D_{ik})\right]$$

Due to EQ. 3 above, and the fact $c_o > c_i$ it is straightforward to see that the above k-cut weight change is positive, i.e., before the swap of the VMS i,j, the BMKP problem achieves optimality. Thus, the k-cut is optimal when the VMPP is optimal.

The proof also reveals that the BMKP optimality is a necessary but insufficient condition for the associated VMPP being optimal. This is because when BMKP achieves optimal, two VMS can always be swapped, both of which are assigned to the same slot-cluster. This does not affect the k-cut weight, but it can possibly reduce the value of the VMPP objective function.

Previous analysis shows that the VMPP problem is NP-hard and it belongs to the general QAP problem, for which, in general, no existing exact solutions can scale to the size of current data centers. Therefore, in this section an approximation algorithm Cluster-and-Cut is discussed that leverages unique features of the traffic and the cost matrices in data centers. The design of at least this embodiment is based on two rationales, with the first one being the following result:

Proposition 1: G. G. Hardy, J. E. Littlewood, and G. Polya, Inequalities. London and New York: Cambridge University Press, 1952, which is hereby incorporated by reference in its entirety, which is hereby incorporated by reference in its entirety, assume $0 \leq a_1 \leq a_2 \ldots \leq a_n$ and $0 \leq v_1 \leq b_2 \ldots \leq b_n$, the following inequalities hold for any permutation $\pi$ on $[1, \ldots, n]$ $$\sum_{i=1}^{n} a_i b_{n-i+1} \leq \sum_{i=1}^{n} a_i b_{\pi(i)} \leq \sum_{i=1}^{n} a_i b_i$$

The VMPP objective function is essentially to sum up all multiplications between any $C_{ij}$ and its corresponding element in D. According to Proposition 1, finding a good approximate to VMPP is intuitively equivalent to searching for a correspondence between VMS and slots such that YM pairs with heavy mutual traffic be assigned to slot pairs with low-cost connections. The second rationale is scalability. Instead of searching for correspondence between VMS and slots, various embodiment of the present invention search for correspondence between VM-clusters and slot-clusters. VM-clusters are obtained via classical mm-cut graph algorithm, which ensures that VM pairs with high mutual traffic rate are within the same VMcluster. Such a feature is consistent with an earlier observation discussed above that traffic generated from a small group of VMS comprises a large fraction of the overall traffic. Slot-clusters are obtained via standard clustering algorithm, which ensures slot pairs with low-cost connections belong to the same slot-cluster. Again, this is consistent with the fact that data center networks often do not have a flat cost matrix. Rather, those high-end switches with dense ports can easily create a group of VMS whose pairwise connections are at low cost.

Figure 6:
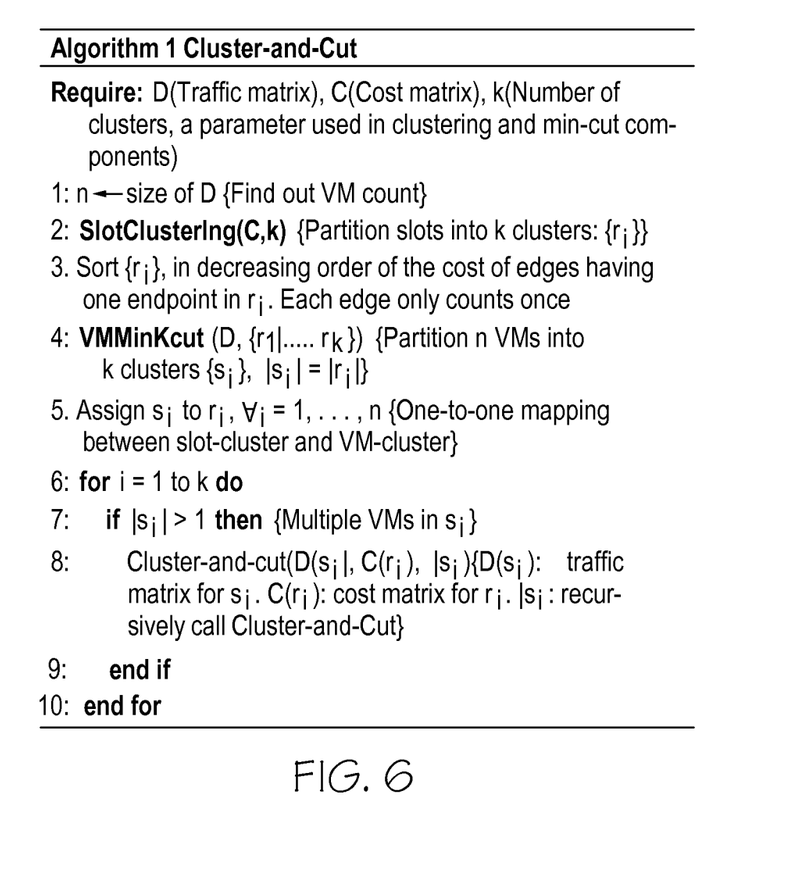
FIG. 6 shows pseudo code for a Cluster-and-Cut algorithm according to one embodiment of the present invention.

FIG. 6 shows the pseudo-code for a cluster-and-cut algorithm according to one embodiment of the present invention. The cluster-and-cut algorithm has two major components. The first major component is SlotClustering. In SlotClustering n slots are partitioned into k clusters by using the cost between slots based on a distance measure. There are two approaches, in one embodiment, in implementing this function. One approach is using the operators' a prior knowledge on network configurations. This approach gives better results, but could be expensive. The other approach is direct clustering based on the traffic matrix. Note that the cost definition of one or more embodiments of the present invention is the number of switches on the path between two slots, so it satisfies the triangle inequality. Thus, this becomes the Minimum k-clustering Problem, which is NP-hard (See Garey et al.). Various embodiments solve this problem using the algorithm in T. Gonzalez. "Clustering to minimize the maximum intercluster distance," *Theoretical Computer Science*, vol. 38, pp. 293-306, 1985, which is hereby incorporated by reference in its entirety, which is hereby incorporated by reference in its entirety, with an approximation ratio 2. The output from SlotClustering is a set of slot-clusters, sorted in decreasing order of the total outgoing and incoming cost.

The second component of the cluster-and-cut algorithm is VMMinKcut. In VMMinKcut n VMs are portioned into k VM-clusters with minimum inter-cluster traffic. The size of each VM-cluster is fixed and specified as input. The partition method used here is adapted from the minimum k-cut algorithm in Saran et al., which is hereby incorporated by reference in its entirety. That algorithm is originally applied to balanced minimum k-cut problems, in which the k clusters have equal size. The approximation ratio for the algorithm is $$\frac{k-1}{k}n.$$

Figure 7:
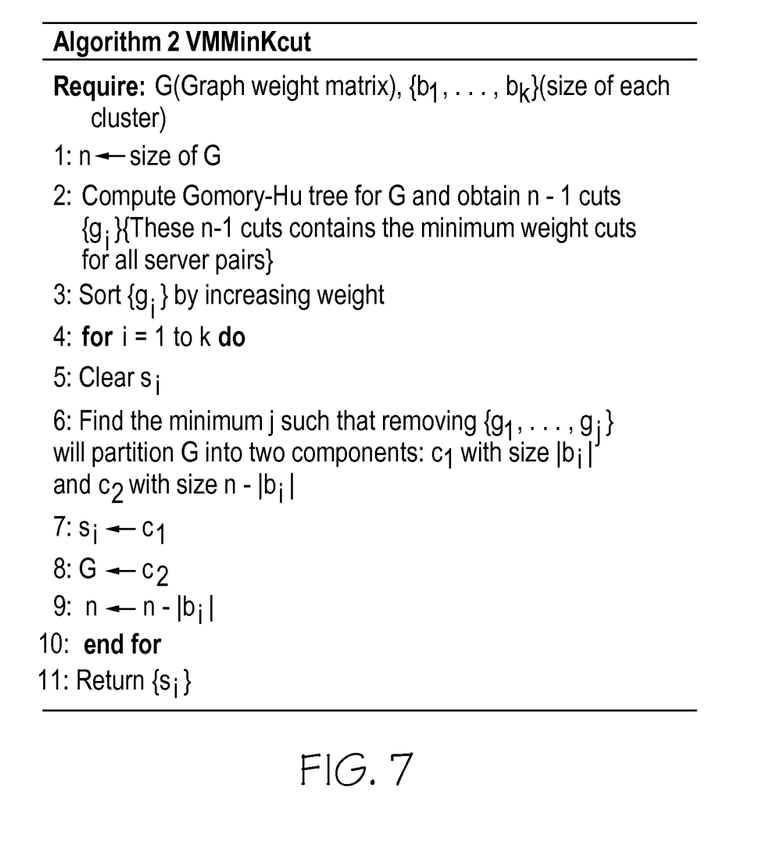
FIG. 7 shows pseudo code for a VMMinKcut algorithm according to one embodiment of the present invention.

The pseudo-code of the adapted algorithm of various embodiments of the present invention is shown in FIG. 7.

A concise explanation is as follows. First, all of the mm-cut for every server pair is identified by applying the classical Gomory-hu's algorithm (See R. E. Gomory and T. C. Hu, "Multi-terminal network flows," *Journal of the Society for Industrial and Applied Mathematics*, vol. 9, no. 4, pp. 551-570, 1961, which is hereby incorporated by reference in its entirety). It is shown in Gomory et al. that there are only n−1 distinct mm-cut among the $$\frac{n(n-1)}{2}$$

total pairs of VMs. Then, a subset of these n−1 mm-cut are found such that their removal from G creates a partition with the requested size. This process continues until all requested clusters are formed. With similar proof as in Saran et al., various embodiments show that this process finds k clusters satisfying the requested size constraint. Further, the cut sorting and removal procedure ensures that smaller cost cuts have higher chance to be removed earlier. As a result, VM-clusters with low outgoing/incoming traffic are more likely assigned to slot-clusters with low-cost outgoing/incoming connections. This complies with the first aforementioned rationale.

In the cluster-and-cut algorithm, after establishing a one-to-one assignment between slot-clusters and VM-clusters (Line 6 of the pseudo code in FIG. 6), the rest of the code solves the VM-to-slot assignment problem within each cluster. One strategy of various embodiment of the present invention is as follows. Given the small cluster size $|s_i|$ each single VM (or a single slot) is treated as a cluster and run Cluster-and-Cut; if $|s_i|$ is still large, one or more embodiments can call Cluster-and-Cut to further divide $s_i$ into smaller partitions and solve the problem recursively.

Computational complexity of this algorithm is determined by the two major components without considering the recursive clustering. SlotClustering has complexity $O(nk)$ (See T. Gonzalez. VMMinKcut is reported to have complexity $O(n^4)$ (See Saran et al., which is hereby incorporated by reference in its entirety. Thus, the total complexity is $O(n^4)$.

Optionally, the output of the cluster-and-cut algorithm can be used in order to identify whether the network cost is close enough to the best possible, and then adjust the alternative solution of the second stage in order for the network cost to be closer to the best possible, potentially in the expense of the server cost. More specifically, after the third stage produces the output as discussed above, one can compare the network cost against the most optimal value that can be achieved. The most optimal value can be produced by running the cluster-and-cut algorithm on the same problem without taking into consideration the server constraints and the server cost. That is, the third stage is given as input the set of VMs and the set of host machines that was originally given as input in the first stage. With this input the cluster-and-cut algorithm produces the best possible placement in terms of network cost. Then if the network cost value of the server constrained solution, i.e. the solution of the combined optimization problem, differs more than certain percentage points than the optimal cost of the network problem, then one or more embodiments can go back to the beginning of the second stage and produce a roughly equivalent solution by expanding or changing the set of servers (as explained before). This process can be repeated multiple times until a good compromise between the server and network cost is achieved.

It should be noted that if VM migration would disrupt application performance, one or more embodiments an introduce constraints in the problem formulation, e.g., the number of VMs getting migrated in a time frame is to not exceed a threshold. As discussed above, static layer 2 and 4 routing protocols were assumed. From the perspective of the problem formulation, a dynamic routing protocol means the cost matrix may be changing. This can happen either due to topology changes, or due to the routing protocols being traffic aware. These changes can potentially lead to an improvement of the VMPP objective value without the need of migrating VMs. It should be noted that with such an improvement two VMs with high mutual traffic may reside in two physically remote LANs.

As can be seen from the above discussion, various embodiments of the present invention take advantage of virtual machine migration to localize high traffic volumes, and thus improve overall network capacity. This becomes a resource assignment problem, which was formally defined as the Virtual Machine Placement Problem (VMPP). The optimal solution to VMPP gives the locations of the VMs that minimize the aggregate traffic volume on switches and simultaneously minimize the average end-to-end latency. Various embodiments showed that VMPP is a NP-hard problem for different data center network architectures. A heuristic algorithm was provided that combines clustering and mm-cut techniques to approximate VMPR. This algorithm of one or more embodiments of the present invention differs from existing methods by, for example, leveraging unique features of the traffic and the network architecture. VMPP can significantly reduce the consumption of network resources when traffic is partitioned among multiple groups of VMs and when the network topology has multiple levels of switches.

As has been shown above, various embodiments of the present invention combine server-based and network-based VM placement when determining how to place VMs within an environment. One or more embodiments combined hard and soft constraints for determining VM placement. The CPU and memory requirements usually are expressed as hard constraints. For example a new VM may require the use of two CPUs, in which case only servers with two or more free CPUs can be used. Similarly memory requirements are expressed as hard constraints as well. In contrast, the network requirements are soft constraints as embodiments try to minimize the traffic incurred within the network.

Various embodiments also used single and pair-wise constraints. The CPU and memory constraints are expressed as constraints on individual servers. In this situation the problem becomes a multi-dimensional vector packing problem. On the other hand, the network constraints are pair-wise between virtual machines and the optimization problem becomes a Quadratic Assignment Problem (QAP). Both vector packing and QAP problem are NP-hard and were solved by various embodiments of the present invention.

Operational Flow Diagram For VM Placement

Figure 8:
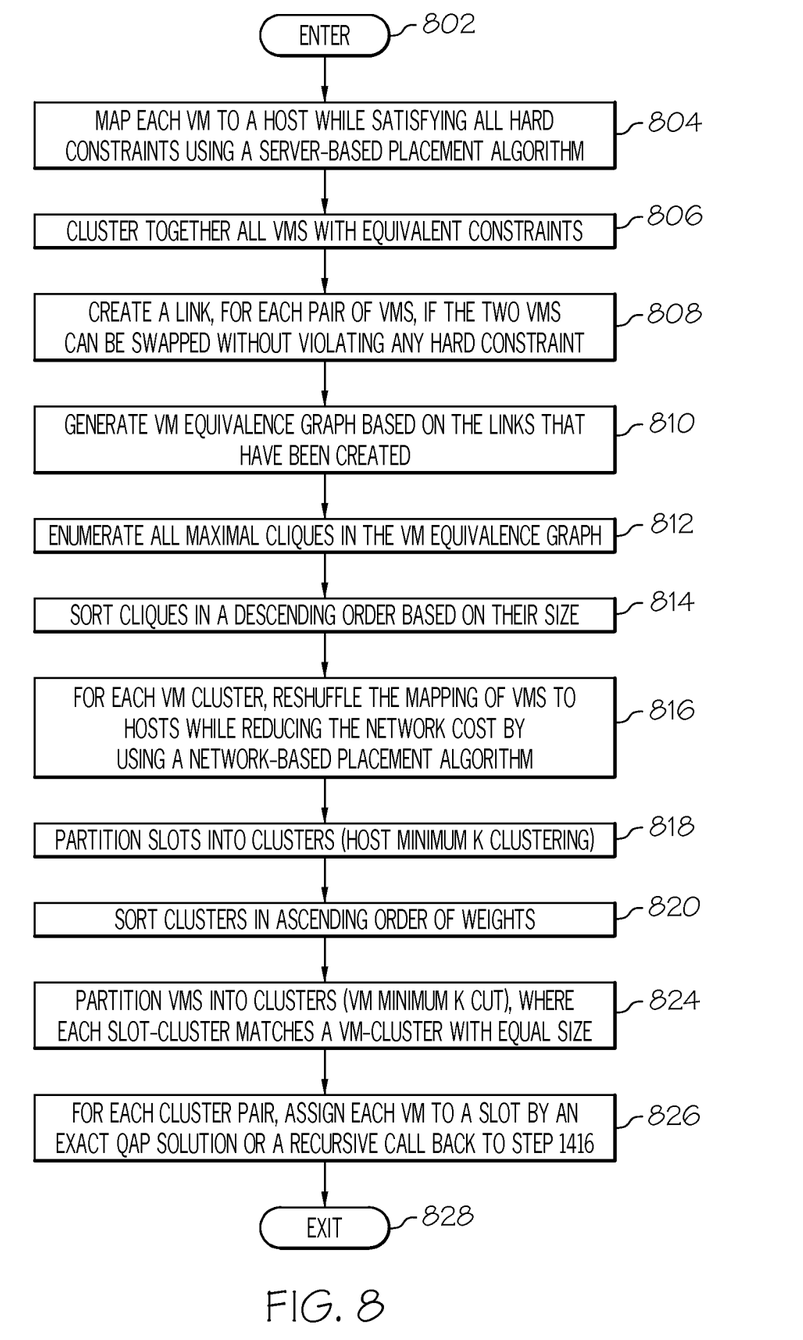
FIG. 8 is an operational flow diagram illustrating one process of placing virtual machines within an operating environment according to an embodiment of the present invention.

FIG. 8 is an operational flow diagram illustrating one process of placing virtual machines within an operating environment. The operational flow diagram of FIG. 8 begins at step 802 and flows directly to step 804. Each VM, at step 804, is mapped to a host while satisfying all hard constraints using a server-based placement algorithm. All VMS, at step 806, with equivalent constraints are clustered together.

The clustering step comprises creating a link, for each pair of VMs, at step 808, if the two VMs can be swapped without violating any hard constraint. A VM equivalence graph 400, at step 810, is generated based on the links that have been created. Then, all maximal cliques in the equivalence graph, at step 812, are enumerated. The cliques are then, at step 814, sorted in descending order based on their size.

Once the VM clusters are created, the mapping of each VM to hosts, for each VM cluster, at step 816, is reshuffled while reducing the network cost by using a network-based placement algorithm. This reshuffling comprises partitioning slots, at step 818, into clusters (Host minimum K clustering). The clusters, at step 820, are sorted in ascending order based on cluster weights. The VMs, at step 824, are then portioned into clusters (VM Minimum K cut), where each slot-cluster matches a VM-cluster with equal size. Then, for each cluster pair, each VM, at step 826, is assigned to a slot by an exact QAP solution or a recursive call back to step 816. The control flow then exits at step 828.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of managing a server placement of virtual machines in an operating environment, the method comprising:

determining, with a processor, a mapping of each virtual machine in a plurality of virtual machines to at least one server in a set of servers, wherein the mapping satisfies a set of primary constraints associated with the set of servers, and wherein the mapping identifies a server in the set of servers that is to host a given virtual machine in the plurality of virtual machines;

creating, based on the mapping, a plurality of virtual machine clusters, wherein each virtual machine cluster in the plurality of virtual machine clusters comprises a set of virtual machines from the plurality of virtual machines, wherein a plurality of virtual machines in the set of virtual machines is mapped to a different server in the set of servers, and wherein a server placement of one virtual machine in the set of virtual machines of a virtual machine cluster is interchangeable with a different server placement of another virtual machine in the set of virtual machines of the virtual machine cluster while satisfying the set of primary constraints, wherein creating the plurality of virtual machine clusters further comprises:

grouping each of the virtual machines in the plurality of virtual machines into a plurality of virtual machine pairs; and creating a set of links between virtual machine pairs in response to a first virtual machine and a second virtual machine in a virtual machine pair being able to be placed on each other's server that has been mapped thereto; and generating, for each virtual machine cluster in the plurality of virtual machine clusters, a server placement of the set of virtual machines within each virtual machine on at least one server that has been mapped to the set of virtual machines, wherein the server placement satisfies a set of secondary constraints.

2. The method of claim 1, wherein the primary constraints are satisfied in combination with optimizing a primary objective function, and wherein the secondary constraints are satisfied in combination with optimizing a secondary optimization function.

3. The method of claim 2, wherein the primary objective function comprises at least one of reducing a number of servers used to migrate the set of virtual machines and a total energy used to perform this migration, and wherein the secondary optimization function comprises at least reducing a network cost.

4. The method of claim 1, wherein the set of primary constraints comprise at least one of processor requirements, memory requirements, and disk requirements, and wherein the set of secondary constraints comprise at least network requirements.

5. The method of claim 1, wherein generating a server placement further comprises:

partitioning the set of servers in to a set of server clusters;

partitioning the plurality of virtual machines into a plurality of virtual machine clusters, wherein each server cluster matches a virtual machine cluster with a equal size; and assigning each virtual machine in the plurality of virtual machine clusters to at least one server in the set of server clusters.

6. The method of claim 5, wherein partitioning the set of servers into a set of server clusters further comprises at least:

determining a network cost between each server in the set of servers, wherein the network cost is based on distance between each server.

7. The method of claim 5, wherein partitioning the plurality of virtual machines into a plurality of virtual machine clusters is based on inter-cluster traffic.

8. An information processing system for managing a server placement of virtual machines in an operating environment, the information processing system comprising:

a memory;

a processor communicatively coupled to the memory; and a virtual machine placement unit communicatively coupled to the memory and the processor, the virtual machine placement unit configured to:

determine a mapping of each virtual machine in a plurality of virtual machines to at least one server in a set of servers, wherein the mapping satisfies a set of primary constraints associated with the set of servers and wherein the mapping identifies a server in the set of servers that is to host a given virtual machine in the plurality of virtual machines;

create, based the mapping of each virtual machine, a plurality of virtual machine clusters, wherein each virtual machine cluster in the plurality of virtual machine clusters comprises a set of virtual machines from the plurality of virtual machines, wherein a plurality of virtual machines in the set of virtual machines is mapped to a different server in the set of servers, and wherein a server placement of one virtual machine in the set of virtual machines of a virtual machine cluster is interchangeable with a different server placement of another virtual machine in the set of virtual machines of the virtual machine cluster while satisfying the set of primary constraints;

wherein the virtual machine placement unit further configured to create the plurality of virtual machine clusters by:

grouping each of the virtual machines in the plurality of virtual machines into a plurality of virtual machine pairs; and creating a set of links between virtual machine pairs in response to a first virtual machine and a second virtual machine in a virtual machine pair being able to be placed on each other's server that has been mapped thereto; and generate, for each virtual machine cluster in the plurality of virtual machine clusters, a server placement of the set of virtual machines within each virtual machine on at least one server that has been mapped to the set of virtual machines, wherein the server placement satisfies a set of secondary constraints.

9. The information processing system of claim 8, wherein the primary constraints are satisfied in combination with optimizing a primary objective function, and wherein the secondary constraints are satisfied in combination with optimizing a secondary optimization function.

10. The information processing system of claim 9, wherein the primary objective function comprises at least one of reducing a number of servers used to migrate the set of virtual machines and a total energy used to perform this migration, and wherein the secondary optimization function comprises at least reducing a network cost.

11. The information processing system of claim 8, wherein the set of primary constraints comprise at least one of processor requirements, memory requirements, and disk requirements, and wherein the set of secondary constraints comprise at least network requirements.

12. The information processing system of claim 8, wherein the virtual machine placement unit further configured to generate a server placement by:

partitioning the set of servers in to a set of server clusters;

partitioning the plurality of virtual machines into a plurality of virtual machine clusters, wherein each server cluster matches a virtual machine cluster with a equal size; and assigning each virtual machine in the plurality of virtual machine clusters to at least one server in the set of server clusters.

13. The information processing system of claim 12, wherein the virtual machine placement unit further configured to partition the set of servers into a set of server clusters based on at least:

determining a network cost between each server in the set of servers, wherein the network cost is based on distance between each server; and wherein the virtual machine placement unit further configured to partition the plurality of virtual machines into a plurality of virtual machine clusters based on inter-cluster traffic.

14. A non-transitory computer program storage product for managing server placement of virtual machines in an operating environment is disclosed, wherein the computer program product comprises:

a storage medium readable by a processing circuit and storing instructions for execution by the processing circuit for performing a method comprising:

determining a mapping of each virtual machine in a plurality of virtual machines to at least one server in a set of servers, wherein the mapping satisfies a set of primary constraints associated with the set of servers, and wherein the mapping identifies a server in the set of servers that is to host a given virtual machine in the plurality of virtual machines;

creating, based on the mapping, a plurality of virtual machine clusters, wherein each virtual machine cluster in the plurality of virtual machine clusters comprises a set of virtual machines from the plurality of virtual machines, wherein a plurality of virtual machines in the set of virtual machines is mapped to a different server in the set of servers, and wherein a server placement of one virtual machine in the set of virtual machines of a virtual machine cluster is interchangeable with a server placement of another virtual machine in the set of virtual machines of the virtual machine cluster while satisfying the set of primary constraints, wherein creating the plurality of virtual machine clusters further comprises:

grouping each of the virtual machines in the plurality of virtual machines into a plurality of virtual machine pairs; and creating a set of links between virtual machine pairs in response to a first virtual machine and a second virtual machine in a virtual machine pair being able to be placed on each other's server that has been mapped thereto; and generating, for each virtual machine cluster in the plurality of virtual machine clusters, a server placement of the set of virtual machines within each virtual machine on at least one server that has been mapped to the set of virtual machines, wherein the server placement satisfies a set of secondary constraints.

15. The non-transitory computer program storage product of claim 14, wherein the primary constraints are satisfied in combination with optimizing a primary objective function, and wherein the secondary constraints are satisfied in combination with optimizing a secondary optimization function.

16. The non-transitory computer program storage product of claim 15, wherein the primary objective function comprises at least one of reducing a number of servers used to migrate the set of virtual machines and a total energy used to perform this migration, and wherein the secondary optimization function comprises at least reducing a network cost.

17. The non-transitory computer program storage product of claim 14, wherein the set of primary constraints comprise at least one of processor requirements, memory requirements, and disk requirements, and wherein the set of secondary constraints comprise at least network requirements.

18. The non-transitory computer program storage product of claim 14, wherein generating a server placement further comprises:

partitioning the set of servers in to a set of server clusters;

partitioning the plurality of virtual machines into a plurality of virtual machine clusters, wherein each server cluster matches a virtual machine cluster with a equal size; and assigning each virtual machine in the plurality of virtual machine clusters to at least one server in the set of server clusters.

19. The non-transitory computer program storage product of claim 18, wherein partitioning the set of servers into a set of server clusters further comprises at least:

determining a network cost between each server in the set of servers, wherein the network cost is based on distance between each server.

20. The non-transitory computer program storage product of claim 18, wherein partitioning the plurality of virtual machines into a plurality of virtual machine clusters is based on inter-cluster traffic.

* * * * *